2,819,980

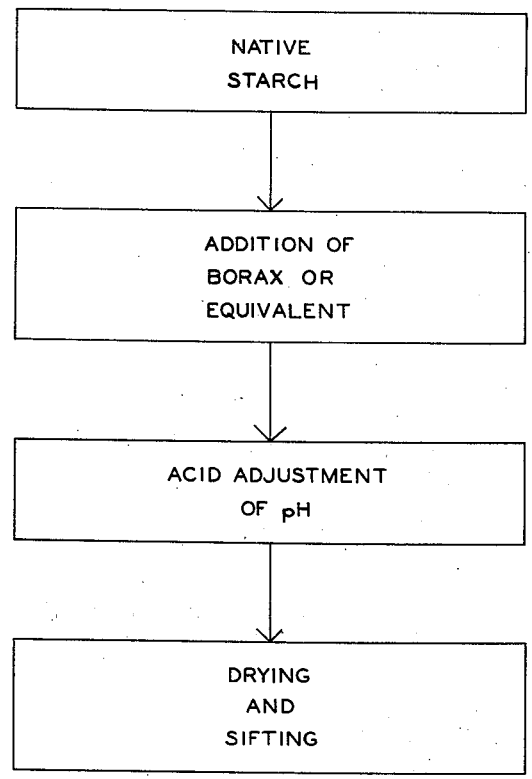
INVENTOR.
FRANK PAUL McCOMBS
ROY GODFREY HYLDEN
BY Jerome R. Cox
ATTORNEY United States Patent Office 2,819,980
Patented Jan. 14, 1958

PROCESS OF PRODUCING A COLD WATER SOLUBLE LAUNDRY STARCH AND THE PRODUCT THEREOF

Frank P. McCombs, Bexley, and Roy G. Hyldon, Columbus, Ohio, assignors to National Industrial Products Company, a corporation of Ohio Application June 20, 1955, Serial No. 516,564

5 Claims. (Cl. 106—213)

The inventions disclosed in this application relate to starch products and processes for producing such products and more particularly to cold water soluble laundry starches and processes for producing them.

Various methods have been employed in the past in efforts to obtain satisfactory cold water dispersible and cold water soluble starch products. One method involves passing moist starch filter cake between heated rolls and grinding the dried gelatinized product to a powder. Another method is one in which the starch is partially hydrolyzed with acid and the converted starch is then gelatinized and dried by passing the aqueous slurry thereof between heated rolls. Another process involves an enzyme treatment by which the starch is hydrolyzed to a low viscosity level which treatment is followed by completely gelatinizing and drying the converted starch on heated rolls. Another process proposes the oxidation of the starch with an oxidizing agent followed by gelatinization and dehydration of the gelatinized paste. In all of these prior art processes, whether by heating, by enzyme treatment, or by acid treatment, or oxidation, a gelatinized or hydrolyzed and gelatinized product is obtained. All of these processes are comparatively costly and involve complications in carrying them out. All of the products of these various processes are not of equal desirable characteristics in that they do not all have rapid dispersibility, high solubility, good solution in cold water, equal stiffener value in sizing, uniformity in the size coating nor the provision of a smooth flexible finish after ironing.

One of the objects of our invention is the provision of a new dry starch product which is rapidly dispersible and highly soluble in cold water (i. e. has a high rate of solution in cold water), is especially adapted for use as laundry starch, exhibits acceptable stiffening value, and has uniformity in size coating, freedom from water spotting on fabric when the latter is sized, dried and sprinkled with water, and the ability to create a smooth, flexible finish when a fabric sized therewith is ironed.

A further object of the invention is the provision of a process for the production of such a starch product which is economical in cost and simple in operation.

A further object is the provision of a starch product which is by reason of the borax constituent more resistant to fire and which makes textiles sized therewith more fire resistant.

Further objects of our invention will be apparent from this specification and the following claims when considered in connection with the accompanying drawings illustrating a process embodying our invention.

In the drawings, the figure is a flow sheet illustrating one embodiment of a process of producing our improved starch.

Referring to the drawing, it may be seen that we take native starch, (1) treat it by the addition of borax or its equivalent, then (2) adjust the pH thereof by the addition of an acid substance, and finally (3) dry and sift.

We prefer to use native starch. We can use either corn starch, wheat starch, or any other of the cereal starches or any combination of these starches.

We prefer to use the starches in a slurry with borax $(Na_2B_4O_7 \cdot 10H_2O)$ in an amount equal to about 13% of the starch by weight. However, the borax may be used satisfactorily in a range of from 7% to about 15%. Instead of borax we can use other boron containing materials such as boric acid, for example. We prefer, however, to use either borax or boric acid. With less than 7% borax, solubility is decreased. With more than 15%, the mixture becomes stiff and hard to handle.

We prefer to adjust the pH to about 4.0, although we have found that mixtures having a pH rating in the range of 3.5 to 6.5 are satisfactory. The dried starch should have a pH rating of between 5.0 and 7.0 inasmuch as it is preferable that the dried starch should be on the acid side. Alkaline starches have a tendency to brown after ironing. If the mixture is too acid the starch is more brittle and tends to flake.

In adjusting the pH of the mixture, any convenient acid may be used. We have used hydrochloric acid and sulfuric acid inasmuch as those acids are the most economical to use. However, any acid is satisfactory inasmuch as the acid does not react with the starch, but the purpose of the addition of the acid is merely to adjust the pH to the acid side.

We prefer to roll the dispersion dry when it has a specific gravity at about 18° Bé. The product may be rolled dry satisfactorily at any density in the range between 13° and 26° Bé. We prefer to sift through a 50-mesh screen. However, it is possible to screen through screens in a range of from 20 to 150 mesh screens depending upon the size of the particles of starch desired in the product. Neither the density nor the size of the screen used in sifting are critical.

Our product has the advantages that it rewets slowly, that it goes into solution smoothly, that it can be dispersed or dissolved in cold water easily, that it gives better starching effect than any previously used instant starch and can be used in smaller amounts than other previously used instant starches. Most instant starches are alkaline, and alkaline starches have a tendency to brown after ironing.

Borax is provided as a wetting agent. It aids in the solution of the starch and makes it soluble. However, it makes the mixture more alkaline which we find to be a disadvantage, and accordingly, we adjust the pH by the use of acids after the borax has been thoroughly mixed with the starch. The resulting product has been tested in commercial laundries. It can be added at the same time the sour is added, thus saving time in the laundry process. The color, body and drape of the clothes laundered by the use of our product are superior to clothes starched in the conventional manner.

The examples set forth below which are intended as typical and informative only, and not in a limiting sense, will further illustrate our invention. Tests used in characterizing the product obtained will be described hereafter.

*Example I*

We mixed 3 lbs. of wheat starch in a gallon of water and then added and thoroughly mixed 175 grams of borax. The mixture was stirred for 15 minutes. We then added 31 cc. of commercial sulfuric acid which adjusted the pH of the mixture to 4.0. The density reading was 18° Bé. We then rolled dry and then sifted through a 50-mesh screen.

*Example II*

We mixed 3 lbs. of wheat starch in a gallon of water and then added and thoroughly mixed 135 grams of borax. The mixture was stirred for 15 minutes. We then added 26 cc. of commercial sulfuric acid which adjusted the pH of the mixture to 3.5. The density reading was 18° Bé. We then rolled dry and then sifted through a 50-mesh screen.

*Example III*

We mixed 3 lbs. of wheat starch in a gallon of water and then added and thoroughly mixed 200 grams of borax. The mixture was stirred for 15 minutes. We then added 40 cc. of commercial sulfuric acid which adjusted the pH of the mixture to 5.0. The density reading was 18° Bé. We then rolled dry and then sifted through a 50-mesh screen.

*Example IV*

We mixed 3 lbs. of wheat starch in a gallon of water and then added and thoroughly mixed 175 grams of boric acid. The mixture was stirred for 15 minutes. We then added 2 cc. of commercial sulfuric acid which adjusted the pH of the mixture to 4.0. The density reading was 18° Bé. We then rolled dry and then sifted through a 50-mesh screen.

*Example V*

We mixed 3 lbs. of corn starch in a gallon of water and then added and thoroughly mixed 175 grams of borax. The mixture was stirred for 15 minutes. We then added 32 cc. of commercial sulfuric acid which adjusted the pH of the mixture to 4.0. The density reading was 18° Bé. We then rolled dry and then sifted through a 50-mesh screen.

*Example VI*

We mixed 3 lbs. of a blend of 50% wheat starch and 50% corn starch in a gallon of water and then added and thoroughly mixed 175 grams of borax. The mixture was stirred for 15 minutes. We then added 30 cc. of commercial sulfuric acid which adjusted the pH of the mixture to 4.0. The density reading was 18° Bé. We then rolled dry and then sifted through a 50-mesh screen.

*Example VII*

We mixed 3 lbs. of wheat starch in a gallon of water and then added and thoroughly mixed 175 grams of borax. The mixture was stirred for 15 minutes. We then added 108 cc. of commercial hydrochloric acid which adjusted the pH of the mixture to 3.5. The density reading was 18° Bé. We then rolled dry and then sifted through a 50-mesh screen.

*Example VIII*

We mixed 3 lbs. of wheat starch in a gallon of water and then added and thoroughly mixed 175 grams of borax. The mixture was stirred for 15 minutes. We then added 31 cc. of commercial sulfuric acid which adjusted the pH of the mixture to 3.5. The density reading was 18° Bé. We then rolled dry and then sifted through a 50-mesh screen.

*Example IX*

We mixed 3 lbs. of a blend of starch consisting of 50% wheat starch and 50% corn starch in a gallon of water and then added and thoroughly mixed 195 grams of boric acid. The mixture was stirred for 15 minutes. The pH was 4.2. The density reading was 18° Bé. We then then rolled dry and then sifted through a 50-mesh screen.

The resulting products of the above Examples I–IX, inclusive, were tested in commercial laundries. They were added at the same time that the sour was added, thus saving at least five minutes for each load of clothes. The color and body and drape of the clothes was superior to clothes starched in the conventional manner. Dispersibility of the resulting product in water at 25° C. was 10 seconds. Approximately 100% of the starch product was dissolved.

*Example X*

We mixed 3 lbs. of wheat starch in a gallon of water and then added and thoroughly mixed 100 grams of borax. The mixture was stirred for 15 minutes. We then added 20 cc. of commercial sulfuric acid which adjusted the pH of the mixture to 3.5. The density reading was 18° Bé. We then rolled dry and then sifted through a 50-mesh screen. The resulting products were similar to the products of Examples I–IX, inclusive, although the product was not readily soluble in cold water. Its dispersibility rating in water of 25° C. was 30 seconds and only about 20% went into solution.

UTILITY

The product is useful as a laundry starch in sizing clothes and other materials. The process is useful of course in preparing laundry starches, especially our improved product.

It is to be understood that the above described embodiments of our invention are for the purpose of illustration only and various changes may be made therein without departing from the spirit and scope of the invention.

We claim:

1. A process of producing a cold water soluble laundry starch which consists of slurrying a starch, adding borax in an amount corresponding to from 7% to 15% of the starch by weight, adjusting the pH of the mixture to a pH in the range of 3.5 to 6.5 by the addition of an acid, rolling the dispersion dry and sifting.

2. A process of producing a cold water soluble laundry starch which consists of slurrying a starch, adding borax in an amount corresponding to about 13% of the starch by weight, adjusting the pH of the mixture to a pH in the range of 3.5 to 6.5 by the addition of an acid, rolling the dispersion dry and sifting.

3. A process of producing a cold water soluble laundry starch which consists of slurrying a starch, adding from 7% to 15% of the starch by weight, adjusting the pH of the mixture to a pH of about 4.0 by the addition of an acid, rolling the dispersion dry and sifting.

4. A process of producing a cold water soluble laundry starch which consists of slurrying a starch, consisting of a blend of native wheat and corn starches, adding borax in an amount corresponding to from 7% to 15% of the starch by weight, adjusting the pH of the mixture to a pH in the range of 3.5 to 6.5 by the addition of an acid, drying and sifting.

5. A cold water soluble laundry starch produced by the process described in claim 1.

References Cited in the file of this patent

UNITED STATES PATENTS

| | | |
|---|---|---|
| 2,216,179 | Bauer | Oct. 1, 1940 |
| 2,222,873 | Leuck | Nov. 26, 1940 |
| 2,350,653 | Walsh | June 6, 1944 |
| 2,563,014 | Durand | Aug. 7, 1951 |

U. S. DEPARTMENT OF COMMERCE
PATENT OFFICE
CERTIFICATE OF CORRECTION

Patent No. 2,819,980                                        January 14, 1958

Frank P. McCombs et al.

It is hereby certified that error appears in the printed specification of the above numbered patent requiring correction and that the said Letters Patent should read as corrected below.

Column 4, line 45, after "adding" insert --borax in an amount corresponding to--.

Signed and sealed this 18th day of March 1958.

(SEAL)
Attest:
KARL H. AXLINE

Attesting Officer

ROBERT C. WATSON
Commissioner of Patents